United States Patent
Hodgson et al.

(10) Patent No.: US 10,770,833 B2
(45) Date of Patent: Sep. 8, 2020

(54) COUPLING MECHANISM FOR LIGHT VEHICLES

(71) Applicant: Roke Manor Research Limited, Romsey, Hampshire (GB)

(72) Inventors: Michael Hodgson, Romsey (GB); Rebecca Robinson, Romsey (GB); Jack Wakley, Romsey (GB); Edmund Sparks, Romsey (GB)

(73) Assignee: Roke Manor Research Limited, Romsey, Hampshire (GB)

( * ) Notice: Subject to any disclaimer, the term of this patent is extended or adjusted under 35 U.S.C. 154(b) by 209 days.

(21) Appl. No.: 15/903,797

(22) Filed: Feb. 23, 2018

(65) Prior Publication Data

US 2019/0229462 A1 Jul. 25, 2019

(30) Foreign Application Priority Data

Feb. 24, 2017 (GB) .................................. 1702996.8

(51) Int. Cl.
*H01F 7/20* (2006.01)
*H01R 13/62* (2006.01)
(Continued)

(52) U.S. Cl.
CPC .......... *H01R 13/6205* (2013.01); *B60L 53/60* (2019.02); *B64C 39/028* (2013.01);
(Continued)

(58) Field of Classification Search
CPC ... H01R 13/6205; B60L 53/60; B64C 39/028; B64F 1/12; G01B 21/00; H01F 7/0252; H01F 7/20; H01F 7/204
See application file for complete search history.

(56) References Cited

U.S. PATENT DOCUMENTS

| 4,272,042 A | 6/1981 | Slater |
| 6,663,154 B2 | 12/2003 | Pancheri |

(Continued)

FOREIGN PATENT DOCUMENTS

| DE | 102015207979 A1 | 11/2016 |
| GB | 2530626 A | 3/2016 |

(Continued)

OTHER PUBLICATIONS

Aug. 16, 2017—(GB) Search Report—App 1702996.8.

(Continued)

*Primary Examiner* — Bernard Rojas
(74) *Attorney, Agent, or Firm* — Banner & Witcoff, Ltd.

(57) ABSTRACT

A coupling mechanism for coupling a light vehicle to a surface, the coupling mechanism comprising: a magnetic coupling device arranged such that it may be switched between a first mode and a second mode, wherein in the first mode the device generates an external magnetic field less than a first strength, and in the second mode the device generates an external magnetic field of at least a second strength, the second strength being greater than the first strength; and a surface detection unit, coupled to the magnetic coupling device, and arranged to determine when the light vehicle is within a predetermined distance of a surface, wherein in response to the surface detection unit determining that the light vehicle is within the predetermined distance, switching the magnetic coupling device from the first mode to the second mode, to secure the light vehicle to the surface.

21 Claims, 5 Drawing Sheets

(51) Int. Cl.
*B64F 1/12* (2006.01)
*G01B 21/00* (2006.01)
*B64C 39/02* (2006.01)
*H01F 7/02* (2006.01)
*B60L 53/60* (2019.01)
*B60P 3/073* (2006.01)

(52) U.S. Cl.
CPC ............... *B64F 1/12* (2013.01); *G01B 21/00* (2013.01); *H01F 7/0252* (2013.01); *H01F 7/20* (2013.01); *H01F 7/204* (2013.01); *B60P 3/073* (2013.01)

(56) References Cited

U.S. PATENT DOCUMENTS

| 2002/0105400 | A1 | 8/2002 | Underwood et al. |
| 2016/0039542 | A1 | 2/2016 | Wang |
| 2016/0221688 | A1 | 8/2016 | Moore |
| 2016/0257401 | A1* | 9/2016 | Buchmueller ........ B64C 39/024 |
| 2016/0332748 | A1 | 11/2016 | Wang |
| 2017/0316375 | A1* | 11/2017 | Gil ........................... E05F 15/77 |
| 2018/0074522 | A1* | 3/2018 | Cantrell .................. B64D 1/22 |

FOREIGN PATENT DOCUMENTS

| IN | 3689MU2013 | 7/2015 |
| KR | 1020120005092 A | 1/2012 |
| WO | 2016022646 A1 | 2/2016 |
| WO | 2016172962 A1 | 11/2016 |

OTHER PUBLICATIONS

NASA Report/Patent No. NAS 1.71:MSC-21095-1, US-Patent-Appl-SN-248010.

Apr. 18, 2018—(EP) Communication with European Search Report—App. No. EP18158387.3.

\* cited by examiner

COUPLING MECHANISM FOR LIGHT VEHICLES

The present disclosure relates to an apparatus for coupling light vehicles to surfaces. In particular, the disclosure relates to coupling light vehicles to surfaces for docking and/or electrical charging of the light vehicle.

BACKGROUND TO THE INVENTION

Mechanisms for coupling vehicles to surfaces are used to securely attach vehicles to surfaces. Such coupling mechanisms include aircraft docking systems which secure aircraft to surfaces after landing to prevent further movement of the aircraft, in order to enable refuelling and transport of the vehicle. An example of such a situation is in the secure attachment of aircraft to the deck of a boat following landing of the aircraft on the boat. Similarly, coupling mechanisms can be used for attaching objects to vehicles, to enable the vehicle to securely transport coupled objects.

In many situations, such as when aircraft are coupled to ships in high sea states, secure coupling is essential to ensure that the aircraft does not move relative to the ship, as any movement can cause damage to the coupled vehicle and/or surrounding equipment or personnel. Moreover, where coupling mechanisms are used to enable vehicles to transport objects, it is important to ensure that the coupled object(s) are securely attached with no risk of unplanned decoupling.

A typical coupling mechanism will use a "lock and key" or "latch and receiver" type mechanism, where at least part of the vehicle will securely interface with a surface, restricting further movement of the vehicle until the interface is released. Such systems typically require careful alignment of vehicle and surface to ensure the coupling mechanism correctly engages. Such alignment sensitive systems present considerable difficulties for unmanned vehicles, especially when the unmanned vehicle is landing on a boat moving under the influence of the sea state or a land vehicle moving over rough terrain. In such cases, the required pre or post landing movement needed to ensure correct alignment for coupling is often impractical and dangerous.

Alternative, or in some cases complimentary, coupling mechanisms use pneumatic or hydraulic means to provide a sufficiently strong coupling force. However, these systems add significant weight to the coupled vehicle. For light vehicles this added weight comprises a considerable proportion of the mass of the vehicle, which in many cases makes pneumatic and hydraulic coupling mechanisms impractical.

There therefore exists a need for an improved coupling mechanism, in particular a coupling mechanism suitable for use in unmanned light vehicles such as unmanned aerial vehicles (UAVs).

SUMMARY OF THE INVENTION

In a first aspect, the present disclosure provides, a coupling mechanism for coupling a light vehicle to a surface, the coupling mechanism comprising: a magnetic coupling device arranged such that it may be switched between a first mode and a second mode, wherein in the first mode the device generates an external magnetic field less than a first strength, and in the second mode the device generates an external magnetic field of at least a second strength, the second strength being greater than the first strength; and a surface detection unit arranged to determine when the light vehicle is within a predetermined distance of a surface, wherein in response to the surface detection unit determining that the light vehicle is within the predetermined distance, switching the magnetic coupling device from the first mode to the second mode, to secure the light vehicle to the surface.

In a second aspect, the present disclosure provides, a light vehicle including one or more coupling mechanisms for coupling light vehicles to ferrous surfaces, comprising: a magnetic coupling device arranged such that it may be switched between a first mode and a second mode, wherein in the first mode the device generates an external magnetic field less than a first strength, and in the second mode the device generates an external magnetic field of at least a second strength, the second strength being greater than the first strength; and a surface detection unit arranged to determine when the light vehicle is within a predetermined distance of a surface, wherein in response to the surface detection unit determining that the light vehicle is within the predetermined distance, switching the magnetic coupling device from the first mode to the second mode, to secure the light vehicle to the surface.

In a third aspect, the present disclosure provides a method of operating a coupling mechanism for coupling a light vehicle to a surface, the method comprising: determining when the light vehicle is within a predetermined distance to a surface; and switching a magnetic coupling device from a first mode to a second mode to secure the light vehicle to the surface, wherein in the first mode the device generates an external magnetic field less than a first strength, and in the second mode the device generates an external magnetic field of at least a second strength, the second strength being greater than the first strength.

BRIEF DESCRIPTION OF THE DRAWINGS

By way of example only, certain aspects will now be described with reference to the drawings, in which.

DETAILED DESCRIPTION OF PREFERRED EMBODIMENTS

Figure 1:
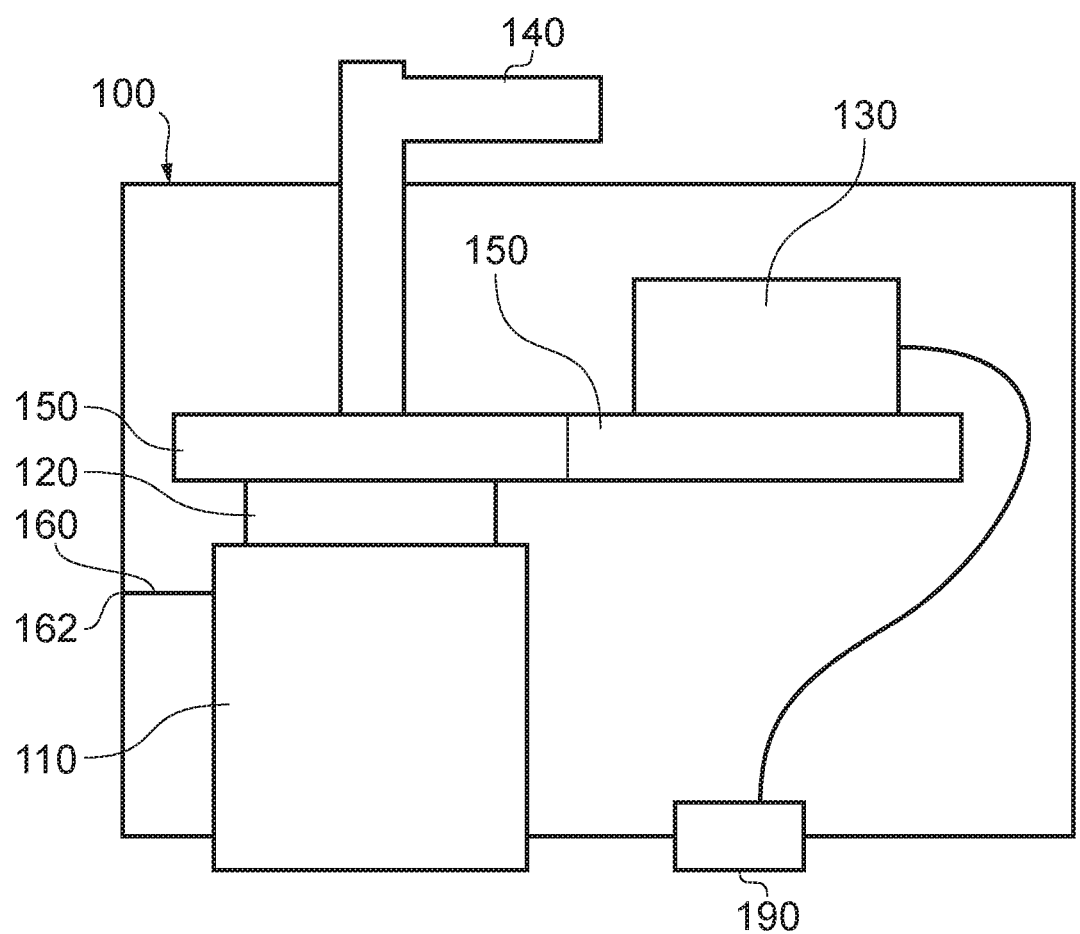
FIG. 1 shows a cross-section through a coupling mechanism in accordance with a first embodiment.

A first embodiment will now be described with reference to FIG. 1. FIG. 1 shows a coupling mechanism 100. The coupling mechanism 100 includes a magnetic coupling device 110. In this embodiment, the magnetic coupling device 110 preferably comprises a permanent magnet (not shown). The permanent magnet may be made of any material that maintains its magnetic properties in the absence of an inducing magnetic field or electrical current. Preferably, the permanent magnet is made of a lightweight material with a high magnetic field strength, such as Neodymium-Iron-Boron (NIB), Iron oxide, Barium Oxide, Strontium Oxide or Magnesium-Aluminium. The permanent magnet may also be an electro-permanent magnet that is electrically switchable into a permanent magnetic state.

The permanent magnet (not shown) is arranged to couple the coupling mechanism 100 to any nearby surface which is attracted to a magnetic field (such as a surface made of a ferromagnetic material, like Iron), by virtue of the magnetic field emanating from the permanent magnet creating an attraction force between the permanent magnet and the nearby magnetically susceptible surface. The size and composition of the permanent magnet, and hence the strength of the magnetic field, are dependent on the intended use of the coupling mechanism 100. When the coupling mechanism 100 is attached to a light vehicle, such as a 10 Kg unmanned aerial vehicle (UAV), the permanent magnet will be selected to generate a sufficient external magnetic field to securely couple both it and the attached light vehicle to the ferrous surface. It is thus evident that the strength of the permanent magnet is dependent on the size of the light vehicle to be coupled. Additionally, more than one coupling mechanism 100 may be present on a single light vehicle thereby reducing the magnetic field strength required from any one coupling mechanism 100 and/or allowing the light vehicle to couple to a surface in more than one aspect. A typical magnetic field strength of the permanent magnet is around 0.1 to 1 T.

An exemplary magnetically susceptible surface is the steel deck plate of a boat. The permanent magnet thus enables the secure coupling of a light vehicle to the steel deck plate of a boat. Alternatively, a portable and/or bespoke magnetically susceptible surface may be provided for use as a landing and coupling site.

One advantage of using a permanent magnet is that the coupling mechanism 100 does not require power to maintain the coupling force. A permanent magnet coupling mechanism also requires fewer moving parts than a comparable hydraulic/pneumatic coupling mechanism and is substantially lighter and easier to maintain than said comparable coupling mechanisms. Furthermore, there is no relative orientation requirement between the light vehicle and the magnetically susceptible surface to enable secure coupling of the light vehicle.

The coupling mechanism 100 also includes a magnetic adapter 120. The magnetic adapter 120 is arranged to minimise the external magnetic field of the permanent magnet in a first position and maximise the external magnetic field of the permanent magnet in a second position. The magnetic adapter 120 may be a second permanent magnet. When a second permanent magnet is arranged in a first position such that the poles of the magnet are anti-symmetric to the first magnet (north-south, north-south) the second permanent magnet will act as an active magnetic shunt, minimising the external magnetic field of the two permanent magnets. When the second permanent magnet is arranged in a second position such that the poles of the magnet are symmetric to the first magnet (north-north, south-south), the external magnetic field of the two permanent magnets is maximised. Such arrangement of permanent magnets has been previously described in, for example, US Patent Publication Number 2002/0105400 A1.

Alternatively, the magnetic adapter 120 may be a magnetic keeper made of a ferromagnetic material, such as iron or steel. When the magnetic keeper is oriented in a first position with respect to the permanent magnet, it completes the magnetic circuit of the permanent magnet and thus the external magnetic field of the permanent magnet is minimised. When magnetic keeper is arranged in a second position such that the magnet circuit of the permanent magnet is not completed, the external magnetic field of the permanent magnet is maximised.

Alternatively, where the permanent magnet is an electro-permanent magnet, the magnetic adapter 120 may be electrical circuitry suitable for switching the electro-permanent magnet into a reduced magnetic field strength state or a non-magnetic state.

One advantage of using a magnetic adapter 120 is that is minimises the external magnetic field when the coupling mechanism 100 is not in use, thereby reducing or negating any effect the magnetic field has on nearby electronic components.

The permanent magnet (not shown) and/or the magnetic adapter 120 are adjustable with respect to each other and in some cases the coupling mechanism 100 itself. Adjusting the position of the permanent magnet and/or the magnetic adapter 120 allows the external magnetic field strength to be adjusted. In the context of the present disclosure, the external magnetic field strength should be taken to be the magnetic field that is generated outside of the magnetic coupling device, i.e. the magnetic field useable for coupling.

The relative position of the permanent magnet (not shown) and the magnetic adapter 120 may be adjusted until the effect of the magnetic adapter 120 on the permanent magnet is negligible, thereby maximising the external magnetic field of the permanent magnet. Preferably, the permanent magnet is fixed and the magnetic adapter 120 is rotated to adjust the relative magnetic polarity of the permanent magnet and the magnetic adapter 120. This relative rotation will cause the external magnetic field strength to increase, reaching a maximum when the magnetic polarity of the permanent magnet and the magnetic adapter 120 are in line.

Adjustment of the external magnetic field strength of the permanent magnet could alternatively be achieved by displacing the permanent magnet (not shown) and/or the magnetic adapter 120 relative to each other. I.e. by an axial displacement of the permanent magnet and/or the magnetic adapter 120.

The coupling mechanism 100 also includes a coupling activation unit 130. The coupling activation unit 130 is arranged to adjust the positioning of the permanent magnet and/or the magnetic adapter 120 to adjust the external magnetic field strength of the permanent magnet. The coupling activation unit 130 is preferably a light-weight high-torque motor operable to rotate the magnetic adapter 120 with respect to the permanent magnet. Such an arrangement enables rapid adjustment of the external magnetic field whilst keeping the overall weight and size of the coupling mechanism 100 down. The coupling activation unit 130 may however be any suitable mechanism to adjust the positioning of the permanent magnet and/or the magnetic adapter 120 such as a servo motor, a stepper motor or a DC motor.

There are many possible translations that may be used to increase the external magnetic field of the permanent magnet including, but not limited to: axial rotation of the permanent magnet, axial rotation of the magnetic adapter 120, off-axis rotation of the permanent magnet and/or the magnetic adapter 120, vertical translation of the permanent magnet and/or the magnetic adapter 120, off-axis translation of the permanent magnet and/or the magnetic adapter 120.

The coupling activation unit 130 may be directly coupled to the permanent magnet (not shown) and/or the magnetic adapter 120. Alternatively, the coupling activation unit 130 may be coupled to permanent magnet and/or the magnetic adapter 120 via one or more gears 150. The one or more gears 150 enable the coupling activation unit 130 to be offset from the permanent magnet and/or the magnetic adapter, allowing the coupling mechanism 100 to be constructed in a variety of alternative form factors.

The coupling mechanism 100 also includes a surface detection unit 190. The surface detection unit 190 is directly or indirectly coupled to the coupling activation unit 130. The surface detection unit 190 may be directly coupled to the coupling activation unit 130 by a wired connection or a wireless connection. Alternatively, the surface detection unit 190 may be directly coupled to an intermediary computing unit (not shown), which in turn is directly coupled to the coupling activation unit 130.

The surface detection unit 190 is arranged to determine when the light vehicle is within a predetermined distance to a surface. The predetermined distance may be 0, i.e. when the coupling mechanism is in contact with the surface. In this case, the surface detection unit 190 may comprise a switch or micro switch, which determines that the light vehicle is within the predetermined distance to the surface by physical contact between the switch and the surface.

Alternatively, the predetermined distance used by the surface detection unit 190 may be non-zero. In this case, the surface detection unit 190 may determine the proximity of a surface by use of one or more of a machine vision system, an optical sensor, a radar based sensor, a sonar based sensor, a hall effect sensor and so forth. The predetermined distance may therefore be many metres up to tens of thousands of metres in the case of using a radar based sensor. Preferably, the surface detection unit 190 comprises a machine vision system which is trained to recognise possible landing sites and activate the coupling activation unit 130 as necessary.

The surface detection unit 190 may also comprise more than one of the above sensors, which in combination may enhance the accuracy of the system or allow the system to operate in a wide variety of environments. For example, the combination of a machine vision system and a radar sensor will enable the system to operate in both ideal conditions and low-visibility conditions. Alternatively, the combination of a machine vision system and a micro switch enables both accurate long range landing site recognition and accurate recognition of surface contact. Thus the surface detection unit 190 enables both recognition of a landing site and confirmation of landing.

The surface detection unit 190 may further comprise a sensor capable of detecting the magnetic susceptibility of a surface. Such a sensor may be, for example, a hall effect sensor or a magnetometer. The surface detection unit 190 may therefore be arranged to detect if the magnetic susceptibility of a surface is greater than a predetermined level. The predetermined level may be zero or non-zero. By careful selection of the predetermined level, detection of, for example, steel and iron surfaces is possible. This enables the magnetic coupling device 110 to be switched from a first "low external magnetic field" mode to a second "high external magnetic field" mode only upon detection that the light vehicle is within a predetermined distance to a surface with a magnetic susceptibility greater than the predetermined level.

The coupling mechanism 100 may also include manually operable means 140 arranged to adjust the position of the permanent magnet (not shown) and/or the magnetic adapter 120, bypassing the coupling activation unit 130. The manually operable means 140 is preferably a lever arranged to adjust the relative position of the permanent magnet and/or the magnetic adapter 120. The manually operable means 140 enables the light vehicle to be coupled and decoupled to a magnetically susceptible surface manually, providing a manual override to the coupling activation unit 130.

The coupling mechanism 100 may further comprise an electrical pathway 160. A first end (not shown) of the electrical pathway 160 is arranged to contact the surface when the coupling mechanism 100 is coupled to a surface. A second end 162 of the electrical pathway 160 is arranged to be connectable to the electrical system of the light vehicle (not shown) the coupling mechanism 100 is connected to in use. Therefore, in use, the electrical pathway 160 provides an electrical link from the surface to the electrical system of the light vehicle. Such an electrical link may be used, for example, for recharging any batteries on board the light vehicle and/or powering the electrical systems of the light vehicle directly.

The electrical pathway 160 may be any suitable electrical link, such as a twisted wire pair. The electrical link thus provides a way to power or recharge any electrical system connected to the second end 162 of the electrical pathway. The electrical pathway 160 may additionally, or alternatively, be used to provide a communication link between the light vehicle and any surface to which it is coupled.

When the coupling mechanism 100 comprises a permanent magnet (not shown), the electrical pathway 160 may be formed, at least in part, by the permanent magnet, as typically the permanent magnet will be made of an electrically conductive material. In this manner, the overall weight of the coupling mechanism 100 can be further reduced.

The operation of the coupling mechanism 100 will now be described in more detail, with reference to FIG. 2.

Figure 2:
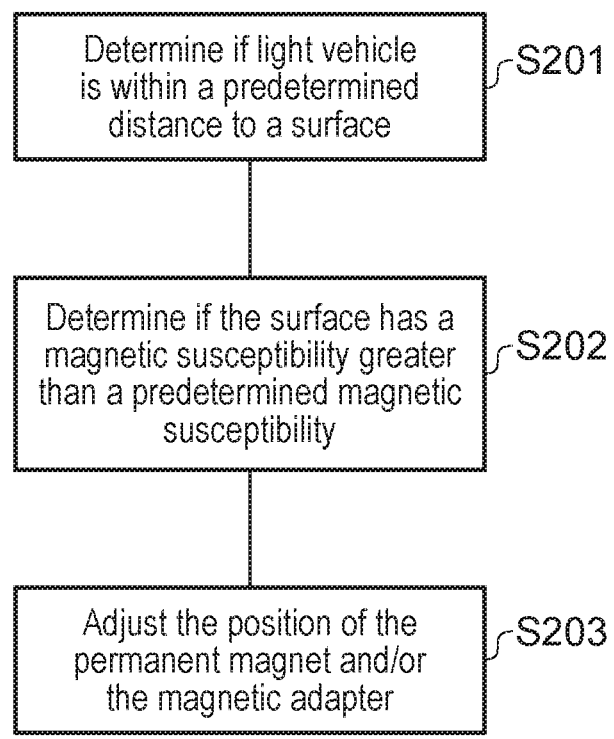
FIG. 2 is a flow-chart showing the operation of the coupling mechanism in accordance with an embodiment.

FIG. 2 is a flow-chart showing the operation of the coupling mechanism 100. The surface detection unit 190 determines (S201) that the light vehicle is within a predetermined distance to a surface based on one or more received signals.

Optionally, the surface detection unit 190 determines (S202) that the surface has a magnetic susceptibility of more than a predetermined magnetic susceptibility, based on one or more received signals.

Upon determination that the light vehicle is within a predetermined distance to a surface, and optionally that the surface has a magnetic susceptibility of more than a predetermined magnetic susceptibility, the coupling activation unit 130 adjusts (S203) the relative positioning of the permanent magnet and/or the magnetic adapter 120 to increase the external magnetic field strength of the permanent magnet. If the surface is magnetically susceptible, a magnetic attraction force is generated between the permanent magnet and the surface, coupling the coupling mechanism to the surface.

Figure 3:
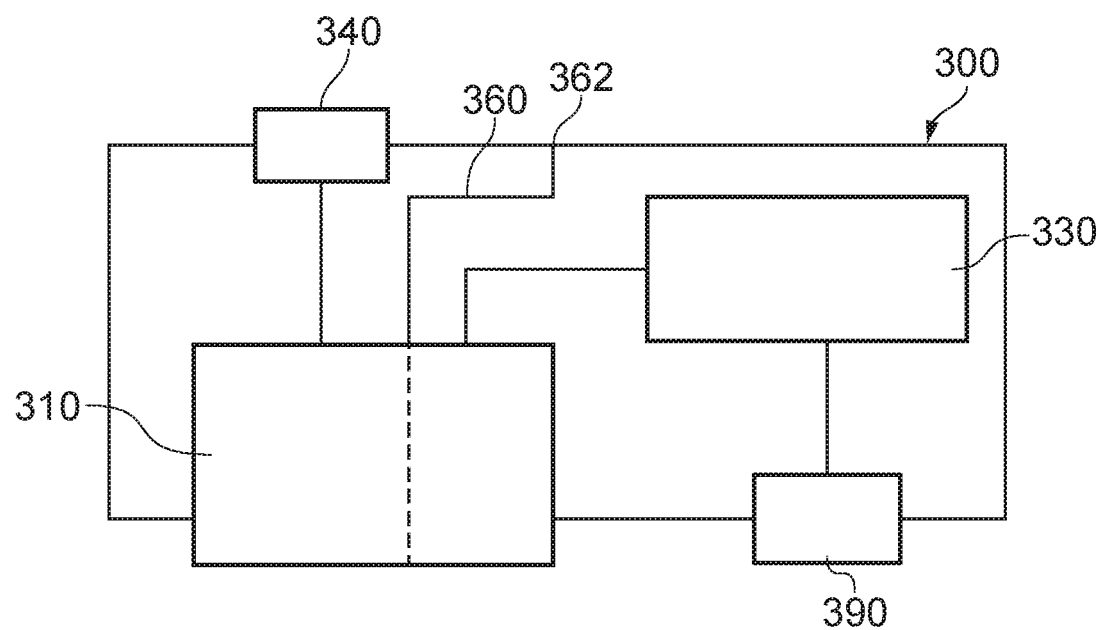
FIG. 3 shows a cross-section through a coupling mechanism in accordance with a second embodiment.

A second embodiment will now be described with reference to FIG. 3. FIG. 3 is similar to the first embodiment but differs in that the magnetic coupling device 310 comprises an electromagnet (not shown) rather than a permanent magnet.

FIG. 3 shows the coupling mechanism 300 in accordance with the second embodiment. The coupling mechanism 300 includes a magnetic coupling device 310. In this embodiment, the magnetic coupling device 310 preferably comprises an electromagnet. The electromagnet may be made of any material and arranged in any shape, such that it generates a magnetic field when an electrical current is passed through it.

The electromagnet is arranged to couple the coupling mechanism 300 to any nearby surface which is attracted to a magnetic field (such as a surface made of a ferromagnetic material, like Iron), by virtue of the magnetic field emanating from the electromagnet creating an attraction force between the electromagnet and the nearby magnetically susceptible surface. The size and composition of the electromagnet, and hence the strength of the magnetic field, are dependent on the intended use of the coupling mechanism 300. When the coupling mechanism 300 is attached to a light vehicle, such as a 10 Kg unmanned aerial vehicle (UAV), the electromagnet will be selected to generate a sufficient external magnetic field to securely couple both it and the attached light vehicle to the ferrous surface. It is thus evident that the strength of the electromagnet is dependent on the size of the light vehicle to be coupled. Additionally, more than one coupling mechanism 300 may be present on a single light vehicle thereby reducing the magnetic field strength required from any one coupling mechanism 300 and/or allowing the light vehicle to couple to a surface in more than one aspect. A typical magnetic field strength of the electromagnet is around 0.1 to 1 T.

The coupling mechanism 300 may comprise one or more batteries (not shown) to provide the necessary electrical current to the electromagnet to produce an external magnetic field. Alternatively, the electromagnet may be coupled to an electrical power supply on board the light vehicle, or provided on a surface on which the light vehicle is to couple. Additionally, a combination of these power systems may be provided. In this case a small battery in the coupling mechanism 300 may provide the initial electrical current required to couple the light vehicle to the surface, whereby the subsequent electrical current required to maintain the coupling force is provided from the surface or the light vehicle's power systems.

One advantage of using an electromagnet is that the coupling mechanism 300 is that it is light weight and requires few (if any) moving parts. An electromagnetic coupling mechanism is therefore substantially lighter and easier to maintain than a comparable hydraulic/pneumatic coupling mechanism. Furthermore, there is no relative orientation requirement between the light vehicle and the magnetically susceptible surface to enable secure coupling of the light vehicle.

The coupling mechanism 300 also includes a coupling activation unit 330. The coupling activation unit 330 is arranged to adjust the positioning of the electromagnet and/or the electrical current supplied to the electromagnet, to adjust the external magnetic field strength of the electromagnet. The coupling activation unit 330 may be a lightweight high-torque motor operable to translate the electromagnet with respect to the magnetic coupling device 310. As with the first embodiment, gears (not shown) may be provided to enable any motor to be offset from the magnetic coupling device 310. The coupling activation unit 330 may however be any suitable mechanism to adjust the positioning of the electromagnet such as a servo motor, a stepper motor or a DC motor. Adjusting the position of the electromagnet allows the external magnetic field strength to be adjusted for a constant electrical current. In the context of the present disclosure, the external magnetic field strength should be taken to be the magnetic field that is generated outside of the magnetic coupling device, i.e. the magnetic field useable for coupling.

Alternatively, or in some cases additionally, the external magnetic field strength of the electromagnet may be adjusted, by the coupling activation unit 330, by altering the electrical current supplied to the electromagnet. In circumstances where a lesser coupling force is required from the coupling mechanism, the use of a reduced electrical current means less electrical power is used (extending the use of any battery supply) whilst maintaining sufficient coupling force.

The coupling mechanism 300 also includes a surface detection unit 390. The surface detection unit 390 is directly or indirectly coupled to the magnetic coupling device 310. The surface detection unit 390 may be directly coupled to the magnetic coupling device by a wired connection or a wireless connection. Alternatively, the surface detection unit 390 may be directly coupled to an intermediary computing unit (not shown), which in turn is directly coupled to the coupling activation unit 130.

The surface detection unit 390 is arranged to determine when the light vehicle is within a predetermined distance to a surface. The predetermined distance may be 0, i.e. when the coupling mechanism is in contact with the surface. In this case, the surface detection unit 390 may comprise a switch or micro switch, which determines that the light vehicle is within the predetermined distance to the surface by physical contact between the switch and the surface.

Alternatively, the predetermined distance used by the surface detection unit 390 may be non-zero. In this case, the surface detection unit 390 may determine the proximity of a surface by use of one or more of a machine vision system, an optical sensor, a radar based sensor, a sonar based sensor, a hall effect sensor and so forth.

The predetermined distance may therefore may be many metres up to tens of thousands of metres in the case of using a radar based sensor. Preferably, the surface detection unit 390 comprises a machine vision system which is trained to recognise possible landing sites and activate the coupling activation unit 330 as necessary.

The surface detection unit 390 may also comprise more than one of the above sensors, which in combination may enhance the accuracy of the system or allow the system to operate in a wide variety of environments. For example, the combination of a machine vision system and a radar sensor will enable the system to operate in both ideal conditions and low-visibility conditions. Alternatively, the combination of a machine vision system and a micro switch enables both accurate long range landing site recognition and accurate recognition of surface contact. Thus the surface detection unit 390 enables both recognition of a landing site and confirmation of landing.

The surface detection unit 390 may further comprise a sensor capable of detecting the magnetic susceptibility of a surface. Such a sensor may be, for example, a hall effect sensor or a magnetometer. The surface detection unit 390 may therefore be arranged to detect if the magnetic susceptibility of a surface is greater than a predetermined level. The predetermined level may be zero or non-zero. By careful selection of the predetermined level, detection of, for example, steel and iron surfaces is possible. This enables the magnetic coupling device 310 to be switched from a first "low/zero external magnetic field" mode to a second "high external magnetic field" mode only upon detection that the light vehicle is within a predetermined distance to a surface with a magnetic susceptibility greater than the predetermined level.

The coupling mechanism 300 may also include manually operable means 340 arranged to enable manual adjustment of the external magnetic field produced by the electromagnet. The manually operable means may adjust the external magnetic field by adjusting the position of the electromagnet. Alternatively, or in some cases additionally, the manually operable means 340 means may adjust the external magnetic field by altering the electrical current supplied to the electromagnet. The manually operable means 340 is preferably a switch arranged to connect or disconnect the electrical current supplied to the electromagnet. The manually operable means 340 enables the light vehicle to be coupled and decoupled to a magnetically susceptible surface manually, providing a manual override to the coupling activation unit 330.

The coupling mechanism 300 may further comprise an electrical pathway 360. A first end (not shown) of the electrical pathway 360 is arranged to contact the surface when the coupling mechanism 300 is coupled to a surface. A second end 362 of the electrical pathway 360 is arranged to be connectable to the electrical system of the light vehicle (not shown) the coupling mechanism 300 is connected to in use. Therefore, in use, the electrical pathway 360 provides an electrical link from the surface to the electrical system of the light vehicle. Such an electrical link may be used, for example, for recharging any batteries on board the light vehicle and/or powering the electrical systems of the light vehicle directly.

The electrical pathway 360 may be any suitable electrical link, such as a twisted wire pair. The electrical link thus provides a way to power or recharge any electrical system connected to the second end 362 of the electrical pathway. The electrical pathway 360 may additionally, or alternatively, be used to provide a communication link between the light vehicle and any surface to which it is coupled.

The electrical pathway 360 may be coupled to the electromagnet (not shown). The electrical pathway 360 may thus supply electrical current to the electromagnet, allowing an external magnetic field to be maintained.

The operation of the coupling mechanism 300 will now be described in more detail, with reference to FIG. 4.

Figure 4:
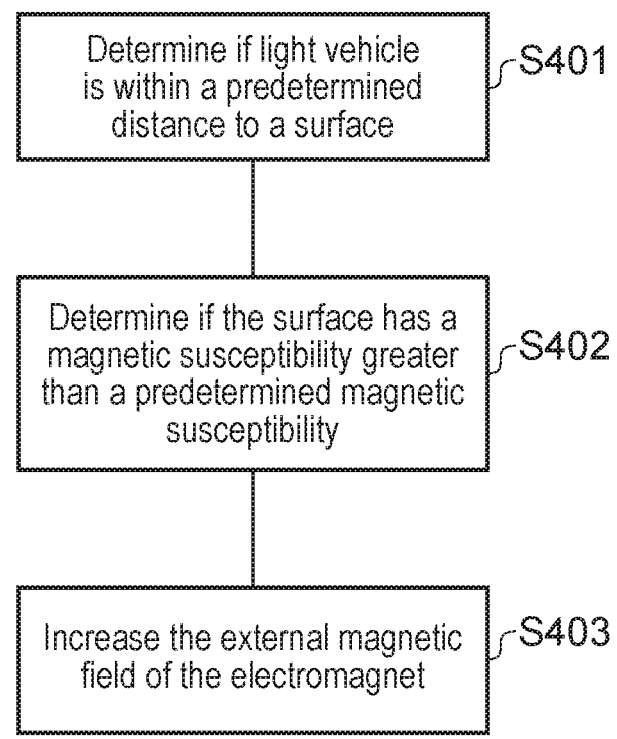
FIG. 4 is a flow-chart showing the operation of the coupling mechanism in accordance with an embodiment.

FIG. 4 is a flow-chart showing the operation of the coupling mechanism 300. The surface detection unit 390 determines (S401) that the light vehicle is within a predetermined distance to a surface based on one or more received signals.

Optionally, the surface detection unit 390 determines (S402) that the surface has a magnetic susceptibility of more than a predetermined magnetic susceptibility, based on one or more received signals.

Upon determination that the light vehicle is within a predetermined distance to a surface, and optionally that the surface has a magnetic susceptibility of more than a predetermined magnetic susceptibility, the coupling activation unit 330 increases (S403) the external magnetic field of the electromagnet. If the surface is magnetically susceptible, a magnetic attraction force is generated between the electromagnet and the surface, coupling the coupling mechanism 300 to the surface.

Figure 5:
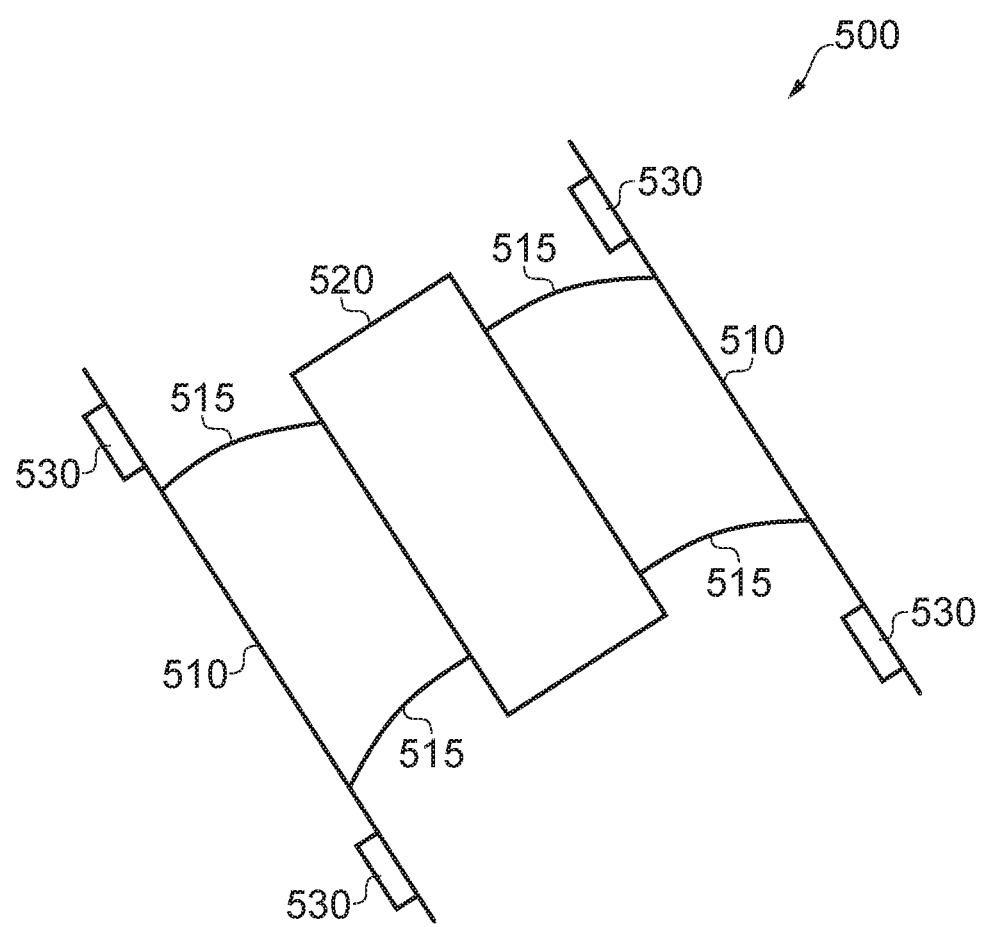
FIG. 5 shows an exemplary use of the coupling mechanism in accordance with an embodiment.

FIG. 5 illustrates an exemplary use of the first, and/or second embodiment. FIG. 5 shows an unmanned aerial vehicle 500 in plain view. The unmanned aerial vehicle 500 has two landing struts 510. The landing struts 510 are each connected to the body 520 of the unmanned aerial vehicle 500 by two support arms 515. FIG. 5 thus illustrates an unmanned aerial vehicle 500 with a helicopter-skid landing arrangement. The unmanned aerial vehicle 500 may be configured in any known rotor arrangement, such as single rotor, quad-rotor or any other multi-rotor design. Alternatively, the unmanned aerial vehicle 500 may be of a rotorless design.

Each of the landing struts 510 in this example has two coupling mechanisms 530 arranged along their length, to make a total of four coupling mechanisms 530 attached to the unmanned aerial vehicle 500. The coupling mechanisms in FIG. 5 are arranged so that they comprise the interface between the unmanned aerial vehicle 500 and any surface. However, they may be arranged in any position which enables them to provide sufficient coupling force to couple the unmanned aerial vehicle 500 to any suitable surface. Moreover, four coupling mechanisms 530 are shown, yet any number of coupling mechanisms may be used, depending on the size and weight of the unmanned aerial vehicle.

The above described embodiments illustrate the use of the coupling mechanism 100, 500 for use in attaching a light vehicle to a magnetically susceptible surface for the purpose of securing the light vehicle to, for example, the deck of a boat. It should be equally understood that the above described embodiments enables a light vehicle to couple to smaller magnetically susceptible objects. When coupled to magnetically susceptible objects with masses less than the transport capacity of the light vehicle, the presently described coupling mechanism enables secure coupling and transport of said objects.

In addition to securing the light vehicle to a surface, the above described embodiments provide advantages to the light vehicle upon detachment and take off from the surface. The above described embodiments help enable a clean disconnection of the light vehicle from the surface as no external components of the light vehicle or surface need to physically move to decouple the light vehicle from the surface. Moreover, the magnetic coupling enables the light vehicle to exceed its take-off throttle (hover throttle) before the magnetic coupling is released, thereby enabling the light vehicle to clear the surface quicker. This improves the ability of a light vehicle to take off in a confined space.

While particular combinations of features have been presented in the claims, it will be appreciated that other combinations, such as those provided above, may be used.

It will be appreciated that modifications of the features of the above embodiments are possible within the scope of the independent claims.

The invention claimed is:

1. A coupling mechanism for coupling a light vehicle to a surface, the coupling mechanism comprising:
   a magnetic coupling device, configured to be attached to the light vehicle, and arranged such that it may be switched between a first mode and a second mode, wherein in the first mode the magnetic coupling device generates an external magnetic field less than a first strength, and in the second mode the magnetic coupling device generates an external magnetic field of at least a second strength, the second strength being greater than the first strength; and
   a surface detection unit, configured to be attached to the light vehicle, and arranged in use to determine a distance between the light vehicle and the surface and to determine when the light vehicle is within a predetermined distance of the surface,
   wherein in response to the surface detection unit determining that the light vehicle is within the predetermined distance, switching the magnetic coupling device from the first mode to the second mode, to couple the magnetic coupling device to the surface and thereby secure the light vehicle to the surface.

2. The coupling mechanism of claim 1, wherein the surface detection unit comprises one or more of a machine vision system, a micro switch, an optical sensor, a radar detection unit and a magnetometer.

3. The coupling mechanism of claim 1, wherein the surface detection unit is further arranged to detect if magnetic susceptibility of the surface is greater than a predetermined level, and the magnetic coupling device is switched from the first mode to the second mode only upon detection that the light vehicle is within a predetermined distance to the surface with a magnetic susceptibility greater than the predetermined level.

4. The coupling mechanism of claim 1, further comprising:
a manually operable means for switching the magnetic coupling device between the first and second modes.

5. The coupling mechanism of claim 1, further comprising:
an electrically conductive pathway, arranged such that one end of the electrically conductive pathway comes into contact with the surface when the light vehicle is in contact with the surface.

6. The coupling mechanism of claim 5, wherein the magnetic coupling device forms at least part of the electrically conductive pathway.

7. The coupling mechanism of claim 1, wherein the magnetic coupling device comprises a permanent magnet.

8. The coupling mechanism of claim 7, wherein switching the magnetic coupling device from the first mode to the second mode comprises adjusting a position of the permanent magnet to be closer to the surface.

9. The coupling mechanism of claim 7, wherein the magnetic coupling device further comprises a magnetic adapter, coupled to the permanent magnet, arranged to minimise the external magnetic field of the permanent magnet in a first position.

10. The coupling mechanism of claim 9, wherein switching the magnetic coupling device from the first mode to the second mode comprises adjusting a position of one or both of the permanent magnet and the magnetic adapter relative to each other.

11. The coupling mechanism of claim 1, wherein the magnetic coupling device comprises an electromagnet.

12. The coupling mechanism of claim 11 wherein switching the magnetic coupling device from the first mode to the second mode comprises increasing electrical current supplied to the electromagnet.

13. The coupling mechanism of claim 11, wherein switching the magnetic coupling device from the first mode to the second mode comprises adjusting a position of the electromagnet to be closer to the surface.

14. A light vehicle, comprising the coupling mechanism of claim 1.

15. The light vehicle of claim 14, wherein the light vehicle is one or more of an unmanned aerial vehicle, an unmanned land vehicle and an unmanned sea vehicle.

16. A method of operating a coupling mechanism for coupling a light vehicle to a surface, the method comprising:
determining, by a surface detection unit attached to the light vehicle when the light vehicle is within a predetermined distance to the surface; and
switching a magnetic coupling device, attached to the light vehicle, from a first mode to a second mode to secure the light vehicle to the surface, wherein in the first mode the magnetic coupling device generates an external magnetic field less than a first strength, and in the second mode the magnetic coupling device generates an external magnetic field of at least a second strength, the second strength being greater than the first strength.

17. The method of claim 16, further comprising:
detecting if magnetic susceptibility of the surface is greater than a predetermined level, wherein the magnetic coupling device is switched from the first mode to the second mode only upon detection that the light vehicle is within a predetermined distance to the surface with a magnetic susceptibility greater than the predetermined level.

18. The method of claim 16, wherein switching the magnetic coupling device from the first mode to the second mode comprises adjusting a position of at least part of the magnetic coupling device to be closer to the surface.

19. The method of claim 16, wherein the magnetic coupling device comprises a permanent magnet and a magnetic adapter, and wherein switching the magnetic coupling device from the first mode to the second mode comprises adjusting a position of one or both of the permanent magnet and the magnetic adapter relative to each other.

20. The method of claim 16, wherein the magnetic coupling device comprises an electromagnet, and wherein switching the magnetic coupling device from the first mode to the second mode comprises increasing the electrical current supplied to the electromagnet.

21. The method of claim 20, further comprising:
determining a presence of an electrical connection between the coupling mechanism and the surface; and
sustaining a supply of electrical current to the electromagnet by use of the electrical connection.

* * * * *